(12) United States Patent  
Bellmann (10) Patent No.: US 11,471,983 B2  
(45) Date of Patent: Oct. 18, 2022

(54) METHOD FOR MONITORING COLLISION WELDING OF A COMPONENT

(71) Applicants: FRAUNHOFER-GESELLSCHAFT ZUR FÖRDERUNG DER ANGEWANDTEN FORSCHUNG E.V., Munich (DE); TECHNISCHE UNIVERSITÄT DRESDEN, Dresden (DE)

(72) Inventor: Joerg Bellmann, Dresden (DE)

(73) Assignees: FRAUNHOFER-GESELLSCHAFT ZUR FOERDERUNG DER ANGEWANDTEN FORSCHUNG E.V., Munich (DE); TECHNISCHE UNIVERSITÄT DRESDEN, Dresden (DE)

( * ) Notice: Subject to any disclaimer, the term of this patent is extended or adjusted under 35 U.S.C. 154(b) by 635 days.

(21) Appl. No.: 16/333,917

(22) PCT Filed: Sep. 8, 2017

(86) PCT No.: PCT/EP2017/072656  
§ 371 (c)(1),  
(2) Date: Mar. 15, 2019

(87) PCT Pub. No.: WO2018/050569  
PCT Pub. Date: Mar. 22, 2018

(65) Prior Publication Data  
US 2019/0202009 A1 Jul. 4, 2019

(30) Foreign Application Priority Data  
Sep. 16, 2016 (DE) ...................... 10 2016 217 758.3

(51) Int. Cl.  
*B23K 31/12* (2006.01)  
*B23K 20/08* (2006.01)  
(Continued)

(52) U.S. Cl.  
CPC ............ *B23K 31/125* (2013.01); *B23K 20/08* (2013.01); *B23K 26/032* (2013.01); *B23K 26/0622* (2015.10)

(58) Field of Classification Search  
CPC .... B23K 26/032; B23K 31/125; B23K 20/06; B23K 20/08; B23K 20/085  
See application file for complete search history.

(56) References Cited

U.S. PATENT DOCUMENTS 7,123,361 B1 * 10/2006 Doughty .................... G01J 3/02  
356/316  
7,268,866 B2 * 9/2007 Messler ............... B23K 26/032  
356/237.1

(Continued)

FOREIGN PATENT DOCUMENTS

DE    3423932      1/1985  
WO   2004/073913   9/2004

OTHER PUBLICATIONS

Bellman et al., "Measurement and analysis technologies for magnetic pulse welding: established methods and new strategies", Adv. Manuf. (2016) 4:322-339 DOI 10.1007/s40436-016-0162-5 (Year: 2016).*

(Continued)

*Primary Examiner* — Erin B Saad  
*Assistant Examiner* — Carlos J Gamino  
(74) *Attorney, Agent, or Firm* — Jacobson Holman PLLC (57) ABSTRACT

The present invention relates to a method and a device for monitoring the process for a welding seam formed by means of collision welding, in which a first joining partner (1) and a second joining partner (2) are moved toward one another by an introduction of energy and are welded to one another to form the welding seam. A light flash between the first joining partner (1) and the second joining partner (2) is detected during the welding by an optical capture unit (6), (Continued)

which measures in a time-resolved manner, having at least one detector (19, 20, 24) and an actual value of a beginning of the light flash, a duration of the light flash, an intensity of the light flash, and/or an intensity distribution over time of the light flash is determined by an analysis unit (16) and compared to a respective target value of the beginning of the light flash, the duration of the light flash, the intensity of the light flash, and/or the intensity distribution over time of the light flash. The weld seam is only classified as qualitatively adequate if a maximum deviation of the actual value from the target value is maintained.

5 Claims, 5 Drawing Sheets

(51) Int. Cl.
*B23K 26/0622* (2014.01)
*B23K 26/03* (2006.01)

(56) References Cited

U.S. PATENT DOCUMENTS

| | | | |
|---|---|---|---|
| 10,195,683 B2* | 2/2019 | Fagan | B23K 31/12 |
| 10,413,995 B2* | 9/2019 | Webster | G01S 17/89 |
| 2010/0133247 A1 | 6/2010 | Mazumder et al. | |
| 2016/0074963 A1* | 3/2016 | Zollinger | B23K 26/0823 |
| | | | 219/121.62 |
| 2016/0074964 A1 | 3/2016 | Zollinger et al. | |

OTHER PUBLICATIONS

Groche et al. Numerical Simulation of Impact Welding Processess with LS-DYNA. 10th European LS-DYNA Conference 2015, Wurzburg, Germany.

Ziefle et al. Shock welding—Process variants and measuring procedures for assessing the welding quality. Schwiessen und Schneider, vol. 66, No. 12, Dec. 1, 2014. pp. 730-736.

* cited by examiner

METHOD FOR MONITORING COLLISION WELDING OF A COMPONENT

The present invention relates to a method and a device for monitoring the process for a welding seam formed by means of collision welding.

Collision welding methods, for example, magnetic pulse welding, often have the disadvantage that a quality of a welding seam formed can only be checked with great effort after ending a welding process. In particular, further examination devices such as ultrasound devices are typically required for this purpose, which makes the overall production process longer and therefore also less cost-effective.

Various approaches are known from the prior art for improved acquisition of the physical procedures during such welding processes (thus, for example, the paper "Numerical Simulation of Impact Welding Processes with LS-DYNA", Peter Groche, Christian Pabst, 10th European LS-DYNA Conference 2015, Würzburg, Germany, discloses a method for the numeric simulation of such welding processes), however, it has heretofore not been possible to perform a quality control during the actual welding process.

The present invention is therefore based on the object of developing a method and a device which avoid the mentioned disadvantages, using which it is thus possible to monitor a welding seam forming in collision welding during a welding process.

This object is achieved according to the invention by a method as claimed in claim 1 and a device as claimed in claim 6. The dependent claims contain advantageous embodiments and refinements.

A method for monitoring the process for a welding seam formed by means of collision welding has a step in which a first joining partner and a second joining partner are accelerated toward one another by an introduction of energy and are welded to one another to form the welding seam. A light flash between the first joining partner and the second joining partner is detected during the welding by an optical capture unit, which measures in a time-resolved manner, having at least one detector. An actual value of a beginning of the light flash, a duration of the light flash, an intensity of the light flash, and/or an intensity distribution over time of the light flash are determined by an analysis unit and compared to a respective target value of the beginning of the light flash, the duration of the light flash, the intensity of the light flash, and/or the intensity distribution over time of the light flash. The welding seam is to be qualified as qualitatively adequate only if a maximum deviation of the actual value from the target value is maintained.

By way of the described method, it is possible to check the welding seam formed in a cost-effective and nondestructive manner while the welding process is carried out, since the typically observed light flash, which is also referred to as a light discharge, permits inferences about the quality of the welding process. Specifically, this is because it can surprisingly be concluded from the beginning and the course of the light flash whether the welding seam was formed as desired. The light flash is initially caused by electromagnetic radiation of a brief (lasting for approximately 1 μs), hot, and dense plasma, followed by longer-lasting electromagnetic radiation of a gas expanding from a joining zone mixed with glowing luminous components of the two joining partners. It is therefore possible by way of a comparison of the target value of the beginning of the light flash to an actual value of the beginning of the light flash, without further measuring instruments or a downstream quality control, to determine the quality of the welding seam formed. Alternatively or additionally, the duration of the light flash can also be determined by the optical capture unit, which measures in a time-resolved manner, and this actual value can be compared to the target value. Finally, this is alternatively or additionally also possible using the intensity of the light flash as the actual value and target value. The intensity distribution over time can also be taken as the actual value and compared to the corresponding target value. Typically, only one of the four mentioned measures is used for the classification, however, it is also possible to use more than one or all four of the mentioned measures, i.e., the beginning of the light flash, the duration of the light flash, the intensity of the light flash, and the intensity distribution over time of the light flash for the classification with respect to an adequate quality of the welding seam.

It can be provided that only components formed by the collision welding from the first joining partner and the second joining partner having a welding seam classified as qualitatively adequate are supplied to further processing by a sorting unit. This guarantees that components having a flawed welding seam are immediately sorted out and the joining and testing method can thus be carried out with high efficiency.

Magnetic pulse welding, explosion welding, waterjet spot welding, welding by joining partner acceleration by means of vaporizing foils, and/or welding by joining partner acceleration by means of laser-induced shock waves can be carried out as the collision welding.

The deviation of the actual value from the target value, which is to be maintained for a qualitatively adequate welding seam, can be predetermined, however, it can also be provided that this deviation is established via a statistical measure on the basis of a plurality of welding processes which are carried out and qualitatively evaluated. These can take place both inside and outside a processing window, to acquire the beginning of the light flash, the duration of the light flash, the intensity of the light flash, and/or the intensity distribution over time of the light flash of both qualitatively adequate and also qualitatively inadequate welding seams. The statistical measure is preferably the standard deviation, particularly preferably two times the standard deviation, i.e., the welding seam is classified as no longer qualitatively adequate in the event of a deviation which is greater than the standard deviation or two times the standard deviation, respectively.

The light flash is typically acquired by a single detector of the optical capture unit, which measures in a time-resolved manner, however, it can also be acquired by at least two detectors of the optical capture unit from at least two different spatial positions, wherein the welding seam is classified as qualitatively adequate only if the maximum deviation of the actual value from the target value is maintained in all detectors. The two detectors can detect in this case the beginning of the light flash, the duration of the light flash, the intensity of the light flash, and/or also the intensity distribution over time of the light flash, however, it can also be provided that one of the two detectors detects one of the mentioned four measures and the further detector detects another of the mentioned four measures. The redundancy and thus the reliability of the method to be carried out are enhanced by the use of two detectors. The target values of various detectors do not have to be identical, but rather can be different from one another and can be adapted to a joining point formation.

A device for monitoring the process for a welding seam formed by means of collision welding has a welding unit for accelerating and welding a first joining partner and a second joining partner by an introduction of energy while forming the welding seam. The device additionally has an optical capture unit, which measures in a time-resolved manner, having at least one detector for detecting a light flash generated during the welding between the first joining partner and the second joining partner and an analysis unit for determining an actual value of a beginning of the light flash, a duration of the light flash, an intensity of the light flash, and/or an intensity distribution over time of the light flash. The analysis unit is additionally designed for comparing the respective determined actual value to a respective target value of the beginning of the light flash, the duration of the light flash, the intensity of the light flash, and/or an intensity distribution over time of the light flash, wherein the analysis unit is configured to classify the welding seam as qualitatively adequate only if the maximum deviation of the actual value from the target value is maintained.

By maintaining the maximum deviation of the actual value from the target value, i.e., by checking whether the actually established actual value is close enough to the target value theoretically required for a high-quality welding seam, reliable and efficient checking of the welding seam formation is enabled.

A sorting unit is typically provided, which is designed to supply only components having a welding seam classified as qualitatively adequate to further processing, so that in and using a single device, both quality control and/or process monitoring and suitable further processing of the components formed from the first joining partner and the second joining partner by the welding procedure are possible.

To enable sufficiently rapid data acquisition, the optical capture unit can be designed having an image recording frequency of at least 1 MHz, i.e., it can be provided as a continuously measuring capture unit. An acceleration of the two joining partners typically lasts 10 μs, and the light flash lasts approximately 100 μs. It is advantageous if at least one data point is provided per microsecond.

The optical capture unit or at least one detector of the optical capture unit is typically designed in the form of a photocell, a photomultiplier, a photodiode, a phototransistor, and/or a photoresistor, to obtain reliable and rapid recordings of the welding procedure and the light flash forming in this case. Optical feed lines such as optical waveguide cables or reflecting surfaces can be connected upstream of the detector in the optical capture unit, in order to implement a spatial separation between an acquisition point of the light flash and a conversion into a measurement signal.

The optical capture unit can have at least two detectors, which are designed to acquire the light flash from at least two different spatial positions, wherein the analysis unit is configured to classify the welding seam as qualitatively adequate only if a maximum deviation of the actual value from the target value is maintained at the majority, preferably at all detectors, wherein the target values of each detector can differ depending on the joining point formation. Flawed detections are thus minimized in the number thereof and reliability of the method is further enhanced.

The described device is suitable for carrying out the described method, i.e., the method can be carried out using the proposed device.

Exemplary embodiments of the invention are illustrated in the drawings and will be explained hereafter on the basis of FIGS. 1-5.

In the figures.

Figure 1:
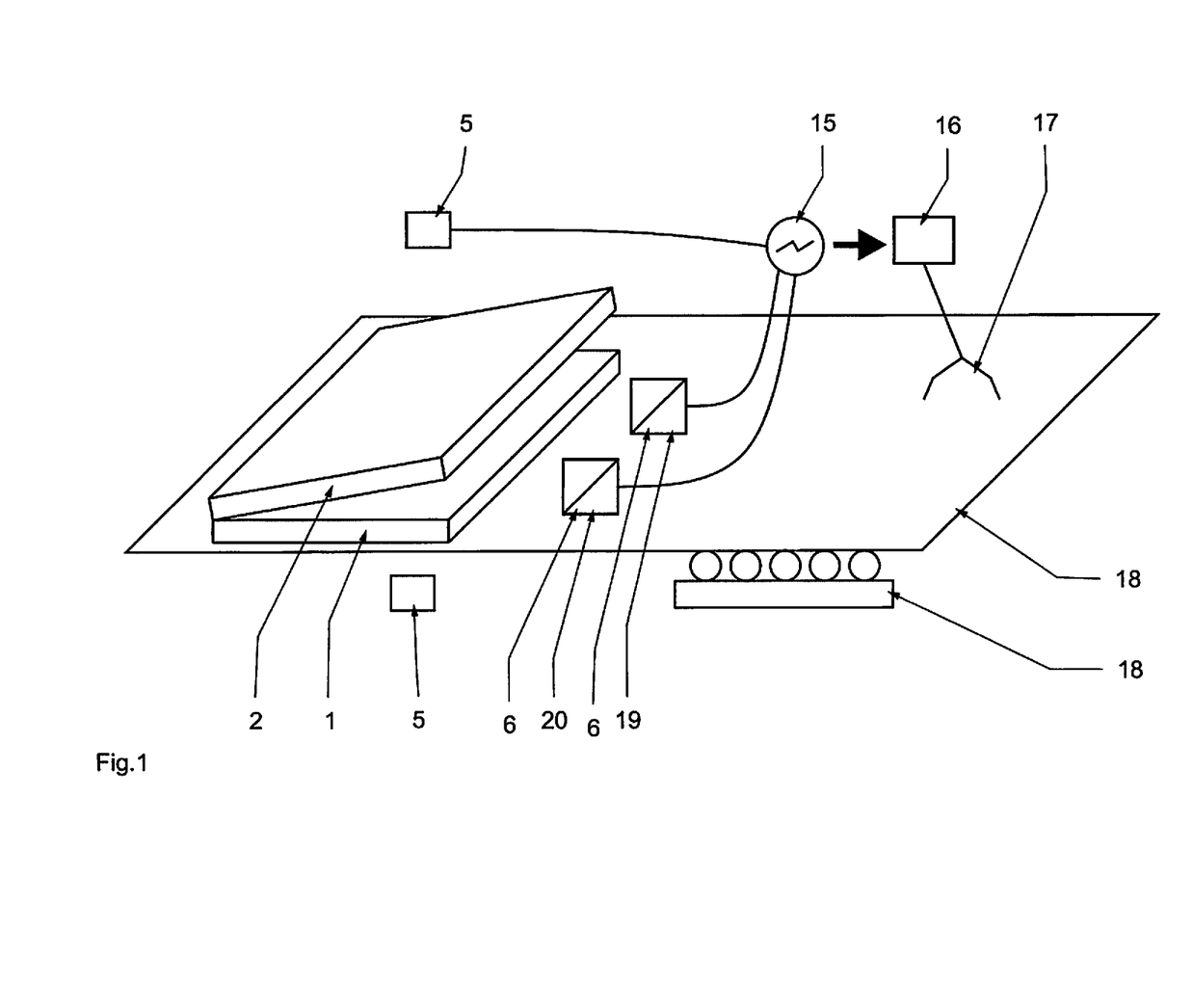
FIG. 1 shows a schematic side view of a device for monitoring the process for a welding seam formed by means of collision welding.

A collision welding process is shown in a schematic side view in FIG. 1. This collision welding process is to enable a locally resolved and nondestructive acquisition of an impact point in time and a welding seam formation in real time for welding using high mechanical energy, i.e., a welding process as defined in DIN EN ISO 4063, 2011, i.e., in particular is to identify magnetic pulse welding (MPW), explosion welding (EXW), collision welding processes by component acceleration by means of vaporizing foils (Vaporizing Foil Actuator Welding VFAW), laser-induced shockwaves (Laser Impact Welding LIW), and water jets (Water-Jet-Spot-Welding WSW).

In all of these methods, a first joining partner 1 and a second joining partner 2 are spatially adjacent to one another and are welded to one another by an introduction of energy to form the welding seam. The introduction of energy can be different depending on the type of the method used and, for example, in the case of magnetic pulse welding, can be a pulsed magnetic field. For this purpose, a welding unit 5 is provided in each of the methods, which is responsible for the introduction of energy onto the first joining partner 1 and/or the second joining partner 2.

In the exemplary embodiment shown in FIG. 1, a light flash arising during the welding between the first joining partner 1 and the second joining partner 2 is detected by an optical capture unit 6, which measures in a time-resolved manner, having two detectors 19 and 20, by way of which inferences can surprisingly be drawn about the quality of the welding seam formed, without a component formed from the first joining partner 1 and the second joining partner 2 having to be subjected to a further examination.

A recording device 15 receives a signal both from the welding unit 5 and also from the optical capture unit 6, which measures in a time-resolved manner. The analysis unit 16 is connected to the recording device 15 and thus determines an actual value of a beginning of the light flash, a duration of the light flash, an intensity distribution over time of the light flash, and/or an intensity of the light flash and compares these measures to a respective target value. The welding seam is classified as qualitatively adequate only if a maximum deviation of the actual value from the target value is maintained.

In the exemplary embodiment shown in FIG. 1, a component formed in this manner is transported further on a conveyor unit 18, for example, a conveyor belt, and a sorting unit 17 is provided, which is also activated by the analysis unit 16, and is designed for the purpose of removing from the conveyor unit 18 the components which do not meet the quality requirement.

The deviation of the actual value from the target value to be maintained can be input at the analysis unit for this purpose before the method is carried out or can be established by the analysis unit 16 via a statistical measure, such as the standard deviation, on the basis of a plurality of welding processes which are carried out and subsequently analyzed.

To ensure continuous image recording, the optical capture unit 6, which measures in a time-resolved manner, is designed having an image recording frequency of at least 1 MHz. The capture unit 6 can be a photocell, a photomultiplier, a photodiode, a phototransistor, and/or a photoresistor.

In addition, the optical capture unit 6, which measures in a time-resolved manner, can have the two detectors 19 and 20 shown, which acquire the light flash from at least two different spatial positions, wherein in addition to the mentioned four measures, the welding seam is classified as qualitatively adequate only if a maximum deviation of the actual value from the target value is maintained at both detectors 19, 20. For this purpose, the two detectors 19 and 20 transmit signals of the light intensity to the analysis unit 16, typically via an electrical connection. The two detectors 19 and 20 also do not have to be designed as identical, thus, for example, the detector 19 can be designed as a photocell while the detector 20 is a photomultiplier. A combination of the detector 19 and/or the detector 20, the amplifier circuit 14, and the analysis unit 16 is possible, for example, by way of optical inputs at oscilloscopes in the analysis unit 16. In further exemplary embodiments, of course, only a single detector can be provided in the optical capture unit 6.

The device shown in FIG. 1 and the method to be carried out thereby enable both deviations in shape tolerances and position tolerances of the first joining partner 1 and the second joining partner 2 in relation to one another and the welding unit 5 and also inadequate or incorrect fixation of the first joining partner 1 and the second joining partner 2 to be detected. Furthermore, deviations in the mechanical properties, such as the modulus of elasticity, a yield point, a hardness, a ductility, or a lateral contraction of the first joining partner 1 and the second joining partner 2 can also be determined. Deviations in collision velocities which can occur due to inadequate accelerations, for example, in the event of coil defects, generator defects, or not enough explosive material, or interfering materials on the surfaces to be joined can be identified as error sources during the formation of the welding seam. Finally, the described device and/or the described method also enable deviations in the surface properties of the joining partners 1, 2, such as roughness or waviness and/or temperature deviations in a joining gap between the first joining partner 1 and the second joining partner 2, to be detected during the welding process.

The fact is utilized in this case that a beginning point in time of the light flash correlates with the collision point in time, which covers asymmetries or shifts in the comparison of the beginning point of time, in particular if spatially distributed detectors 19 and 20 are used. The intensity and duration of the detected light flash correlate with the impact velocity of the participating joining partners 1 and 2, wherein a suitable impact velocity is essential for a correct formation of the welding seam. Foreign bodies on the surface, for example, oil, can drastically shorten the duration of the light flash and thus prevent welding. Surface disturbances, for example, roughness, can also negatively influence the intensity.

Figure 2:
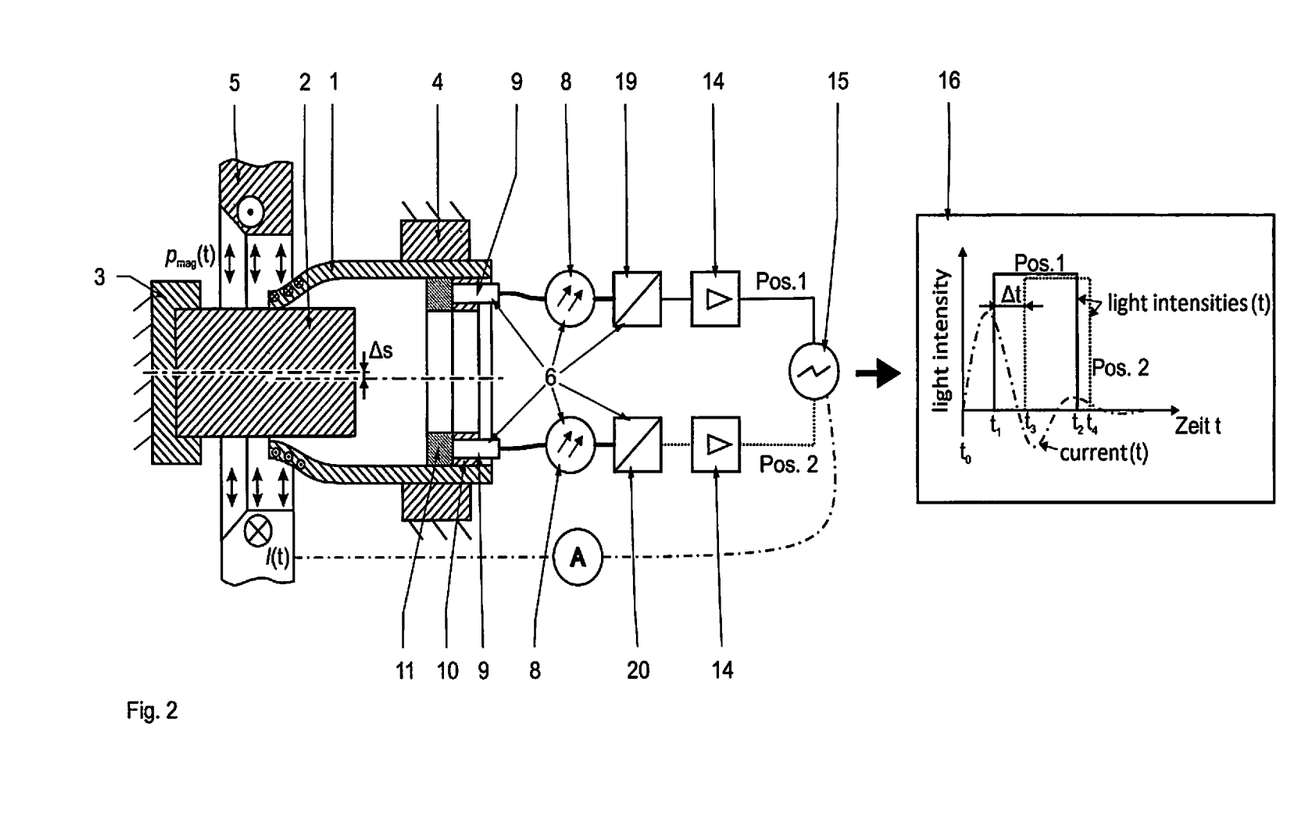
FIG. 2 shows a schematic illustration of a magnetic pulse welding process on the basis of rotationally-symmetrical joining partners.

FIG. 2 shows a schematic view of a device for magnetic pulse welding. Returning features are provided in this figure and also in the following figures with identical reference signs in each case. The first joining partner 1, which is provided with planar or curved surface and is to be locally or globally deformed and/or moved, is held in a first fixation 4. The second joining partner 2, which is also provided with planar or curved surface and is to be locally or globally deformed and/or moved, is also held by a second fixation 3.

An acceleration tool of the welding unit 5 having defined process starting point in time is provided in the illustrated exemplary embodiment in the form of a current-conducting tool coil. The optical capture unit 6, which measures in a time-resolved manner, is a photodetector in the illustrated exemplary embodiment, i.e., an optoelectrical transducer, which can be sensitive to various wavelengths of the electromagnetic spectrum depending on the application. In the illustrated exemplary embodiment, the optical capture unit 6 is provided by two detectors 19 and 20, which each lead via an optical waveguide 8 having optical fitting on the detector 19, 20 to a converging lens 9. The light flash occurring during the welding can be acquired by the two detectors 19, 20 and the converging lenses 9, of which more than two can also exist and can be distributed over a circumference or a length, respectively, in the further exemplary embodiments. For this purpose, the converging lenses 9 are held in a fixation 10 without influencing the joining zone. In the exemplary embodiment shown in FIG. 2, a protective glass 11 is additionally provided in front of the converging lenses 9. The optical capture unit 6 is thus formed in the exemplary embodiment shown in FIG. 2 by the collecting lenses 9, the optical waveguides 8, and the detectors 19 and 20.

A signal detected by the optical capture unit 6 is relayed by an electrical amplifier circuit 14 connected downstream from each of the detectors to a recording device 15, in the illustrated exemplary embodiment an oscilloscope, which requires a chronological zero point (for example, a beginning of an electrical current flow in the coil or an ignition point in time) and in the illustrated exemplary embodiment records a light intensity in relation to this zero point $t_0$. In the analysis unit 16, the beginning, the duration, and the intensity of the light flash are subsequently compared to predefined target values. In the exemplary embodiment shown in FIG. 2, an electrical coil current is shown over time in the illustrated diagram, wherein the beginning is measured at position 1 at point in time $t_3$ and the end of the light flash is measured at point in time $t_4$ and the beginning is detected at position 2 by the second detector at point in time $t_1$ and the end of the light flash is detected at point in time $t_2$. Since point in time $t_1$ is before point in time $t_3$, incorrect positioning is concluded in the case shown.

Figure 3:
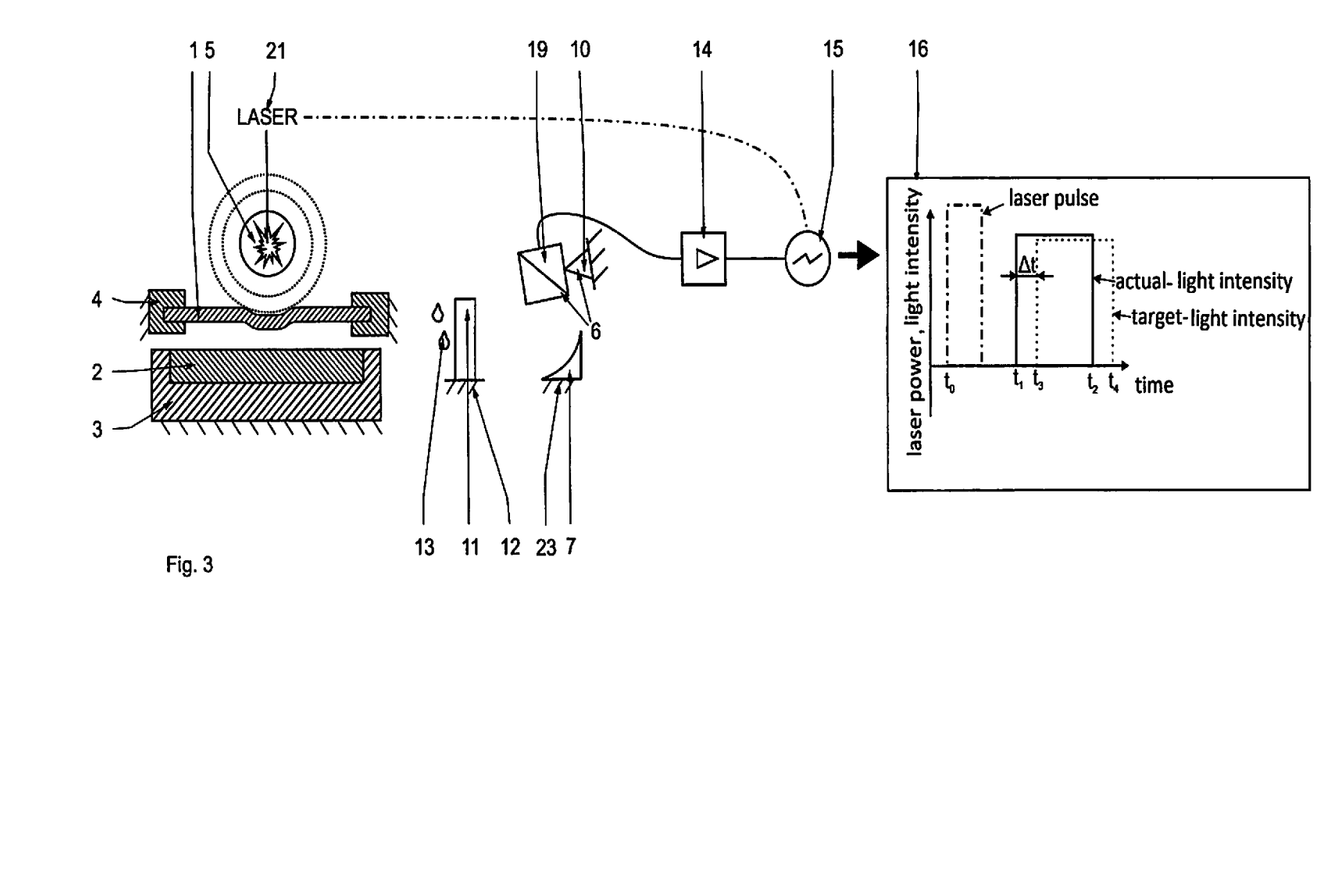
FIG. 3 shows a schematic illustration of a laser-induced shockwave welding process on the basis of plates.

FIG. 3 shows a laser impact welding method in a schematic view. The first joining partner 1 and the second joining partner 2 are again held in the fixations 3 and 4 thereof, but now the introduction of energy for deformation and welding is provided by a laser beam 21. In the illustrated exemplary embodiment, an optical capture unit 6 is again provided, the single detector 19 of which is now arranged in front of a planar or curved deflection mirror 7 having fastening 23 or a planar or curved reflective component surface for reflection of the light discharge or the light flash in the direction of the optical capture unit 6, however, to acquire the intensity of the light flash as completely as possible. For this purpose, the capture unit 6 is provided with the fixation 10. In the illustrated exemplary embodiment, a protective glass 12 is provided without influencing the joining zone, which is provided with a protective glass cleaning 13, which is cleaned, for example, continuously by compressed air or flushing or at intervals by a brush, a compressed air pulse, or a flushing agent pulse. A comparison of the target values and the actual values is again performed in the analysis unit 16, for example, a computer. In the illustrated exemplary embodiment, a laser pulse is registered at point in time $t_0$ and a beginning of the light flash is registered at point in time $t_1$. However, since the target value of the light flash is at $t_3$, and therefore the deviation is greater than permitted, deviating mechanical properties of the respective joining partner from the provided mechanical properties can thus be concluded.

Figure 4:
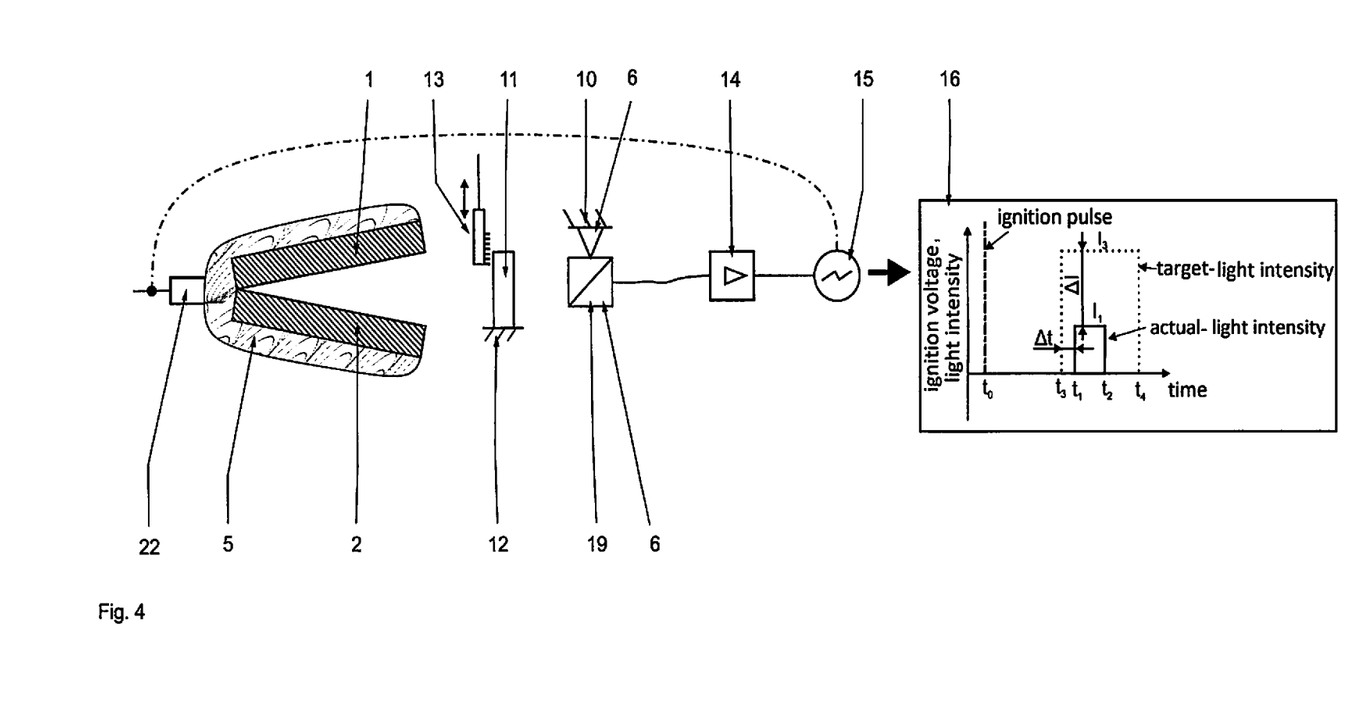
FIG. 4 shows a schematic view of an explosion welding process on the basis of a simultaneous acceleration of both joining partners.

FIG. 4 shows a device for explosion welding, in which explosive is triggered via an igniter 22, so that the first joining partner 1 and the second joining partner 2 are moved toward one another. The electronic analysis is performed as in the above-described examples, wherein the ignition is now detected at point in time $t_0$ in the analysis unit 16. The duration of the light flash as a target value is to comprise in this case the time interval between $t_3$ and $t_4$ and the light flash is to have an intensity $I_3$, but only a length from $t_1$ to $t_2$ and an intensity $I_1$ are measured in the illustrated exemplary embodiment as the actual values. Since the intensity $I_1$ is less than $I_3$ and the measured intensity distribution over time overall does not correspond to the expected intensity distribution over time, an excessively low impact velocity is provided, so that incorrect metering of the explosive medium can be concluded.

Figure 5:
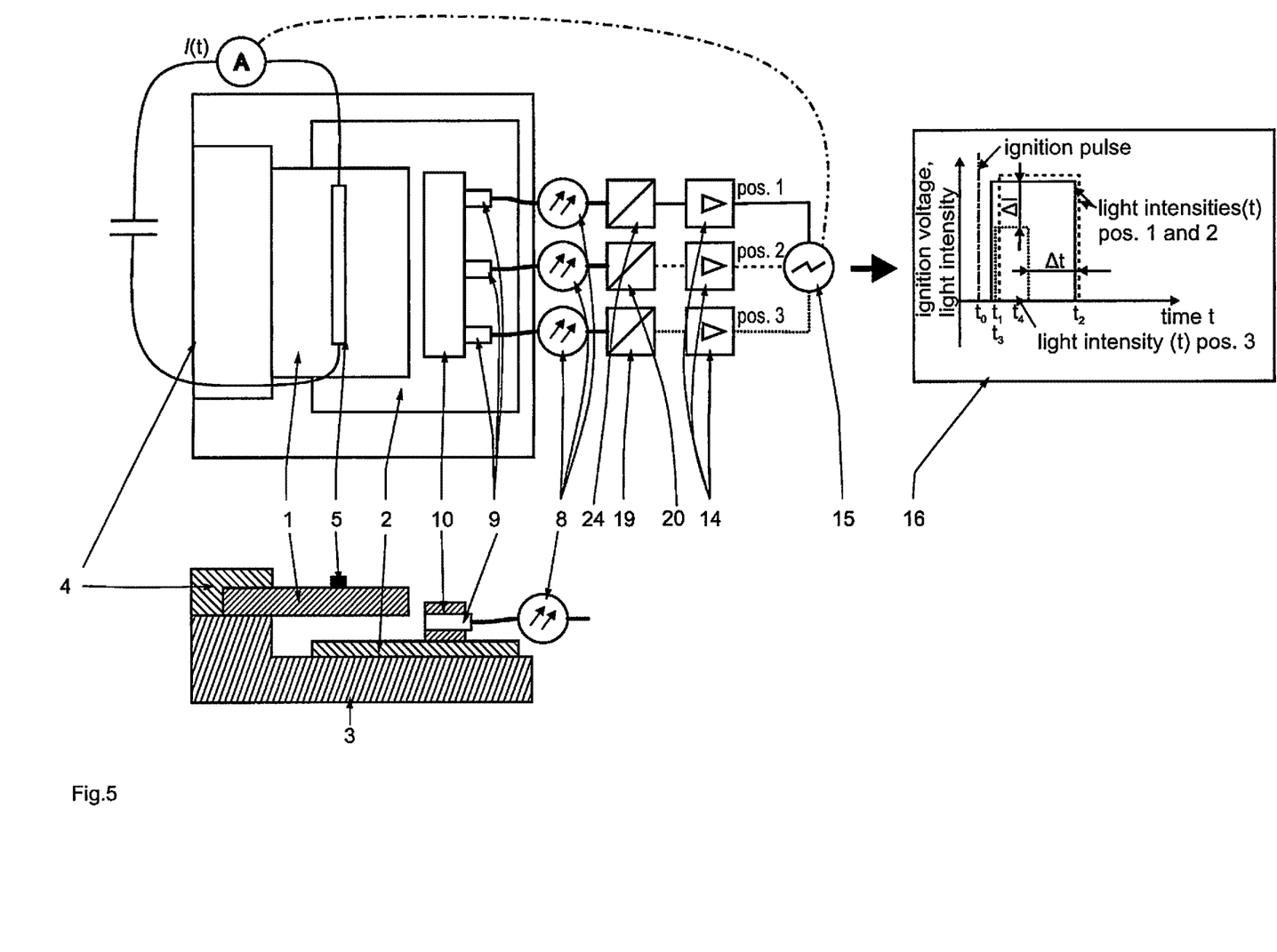
FIG. 5 shows a schematic view of a welding process by means of joining partner acceleration by way of vaporizing foils.

Finally, a schematic illustration of a welding process by component acceleration by means of vaporizing foils is shown in FIG. 5. The arrangement is shown in a lateral view in the lower part of FIG. 5, while a top view of the same arrangement can be seen in the upper part. A total of three detectors 19, 20, and 24 of the optical capture unit 6 are used in the arrangement shown, so that the light flash is detected at three positions. Moreover, the optical capture unit comprises the optical waveguides 8 and the converging lenses 9. In such methods using vaporizing foils, a wire is heated by resistance heating by way of a pulsed electrical current and completely vaporized, so that the first joining partner 1 is accelerated by the pressure of the vaporizing wire in the direction of the second joining partner 2. At a point in time $t_0$, the ignition occurs, wherein it is established on the basis of the diagram in the analysis unit 16 that the detector located at position 3 detects an excessively short light flash, which begins at the correct point in time, however. This indicates interfering materials or roughness or an excessively low temperature in the joining gap. In further embodiments, each of the detectors used can also be designed to detect only one of the four measures mentioned, i.e., for example, the detector 19 detects the beginning of the light flash, the detector 20 detects the duration of the light flash, and the detector 24 detects the intensity distribution over time of the light flash.

Features of the various embodiments which are disclosed only in the exemplary embodiments can be combined one another and claimed individually.

The invention claimed is:

1. A method for monitoring collision welding of a component formed by a welded seam, comprising the steps of:

accelerating a first joining partner and a second joining partner toward one another by an introduction of energy by a welding unit to weld the first and second joining partners to one another to form the welded seam, detecting a light flash between the first joining partner and the second joining partner during the collision welding by an optical capture unit which captures in a time-resolved manner, receiving a signal both from the optical capture unit and the welding unit by a receiving unit connected to an analysis unit, determining with the analysis unit at least one of an actual value of a beginning of the light flash, a duration of the light flash, an intensity of the light flash, or an intensity distribution over time of the light flash, and comparing with the analysis unit the at least one actual value to a respective target value of the beginning of the light flash, the duration of the light flash, the intensity of the light flash, or the intensity distribution over time of the light flash by the analysis unit, wherein the welded seam in the component is only classified as qualitatively adequate if a maximum deviation of the actual value from the respective target value is maintained.

2. The method as claimed in claim 1, wherein only each component formed by the collision welding of the first joining partner and the second joining partner have a welding seam classified as qualitatively adequate is supplied to further processing by a sorting unit.

3. The method as claimed in claim 1, wherein magnetic pulse welding, explosion welding, waterjet spot welding, welding by joining partner acceleration by means of vaporizing foils or welding by joining partner acceleration by means of laser-induced shockwaves is carried out as the collision welding.

4. The method as claimed in claim 1, wherein the maximum deviation of the actual value from the respective target value is to be maintained as inputted to the analysis unit or is established via a statistical measure, on the basis of a plurality of welding processes which are carried out and qualitatively evaluated.

5. The method as claimed in claim 1, wherein the intensity of the light flash is measured by at least two detectors of the optical capture unit from at least two different spatial positions, wherein the welded seam is only classified as qualitatively adequate if the maximum deviation of the actual value from the respective target value is maintained at the at least two detectors.

* * * * *